United States Patent

McLaren

[11] Patent Number: 5,960,889
[45] Date of Patent: Oct. 5, 1999

[54] CORDLESS SOIL TILLER

[76] Inventor: Dan McLaren, P.O. Box 644, Conway, Wash. 98238

[21] Appl. No.: 09/078,626
[22] Filed: May 14, 1998
[51] Int. Cl.⁶ .............................. B26B 25/00; A01B 1/00
[52] U.S. Cl. ............................. 172/37; 172/41; 172/123; 172/375; 172/378; 248/686; 248/688; 248/676
[58] Field of Search ............................. 172/375, 15, 37, 172/41, 123, 378; 248/676, 686, 688

[56] References Cited

U.S. PATENT DOCUMENTS

| | | |
|---|---|---|
| D. 291,272 | 8/1987 | Lewis, Jr. et al. . |
| 1,424,348 | 8/1922 | Farber ...................................... 248/688 |
| 2,052,120 | 8/1936 | Vaughan ............................. 248/688 X |
| 2,086,102 | 7/1937 | Stradling ............................. 248/686 X |
| 2,168,450 | 8/1939 | Robinson ............................. 248/688 X |
| 2,364,295 | 12/1944 | Hyde ................................... 248/688 X |
| 2,395,410 | 2/1946 | Kaesler ................................ 248/676 X |
| 2,467,905 | 4/1949 | Östberg ................................... 248/688 |
| 2,614,779 | 10/1952 | Peterson et al. ..................... 248/688 X |
| 2,881,945 | 4/1959 | Rappaport ................................ 248/688 |
| 3,129,771 | 4/1964 | Lidstone . |
| 3,710,870 | 1/1973 | Pfeiffer . |
| 3,883,789 | 5/1975 | Achenbach et al. . |
| 4,049,059 | 9/1977 | Weibling ................................... 172/15 |
| 4,286,675 | 9/1981 | Tuggle . |
| 4,372,397 | 2/1983 | Goertzen et al. . |
| 4,451,983 | 6/1984 | Johnson et al. . |
| 4,856,748 | 8/1989 | Obermeyer .............................. 248/688 |
| 4,987,681 | 1/1991 | Sepke . |
| 5,404,644 | 4/1995 | Needham et al. .................. 172/378 X |

Primary Examiner—Christopher J. Novosad

[57] ABSTRACT

A soil tiller is provided including a hand held, portable frame having a handle. Also included is a drive assembly having a power source mounted within the frame and a motor for rotating upon the receipt of power from the power source. Next provided is at least one tine assembly rotatable with respect to the frame and further connected to the motor for rotating coincidentally therewith.

9 Claims, 3 Drawing Sheets

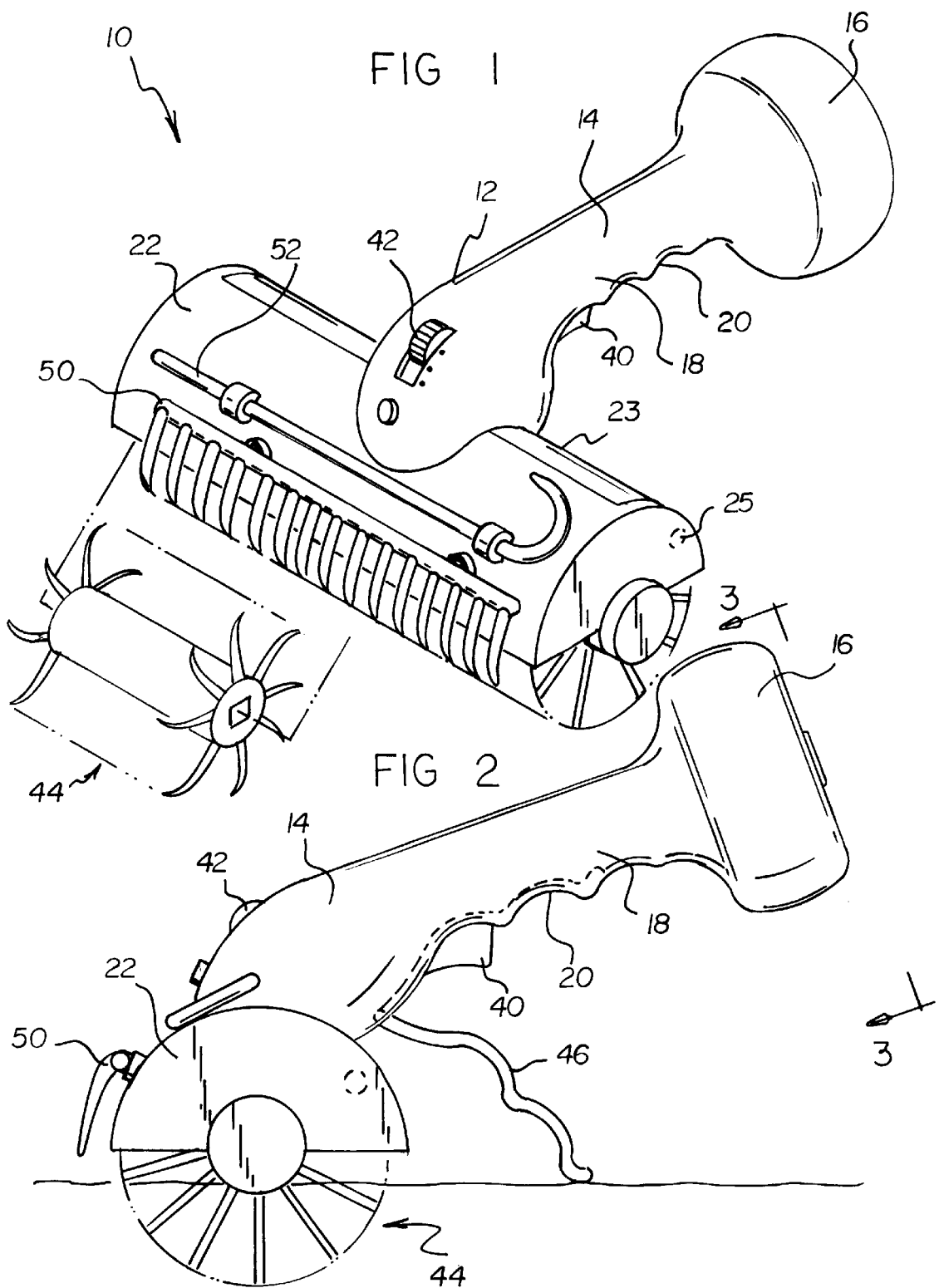

CORDLESS SOIL TILLER

BACKGROUND OF THE INVENTION

1. Field of the Invention

The present invention relates to soil tillers and more particularly pertains to a new cordless soil tiller for conveniently tilling soil with a hand held unit.

2. Description of the Prior Art

The use of soil tillers is known in the prior art. More specifically, soil tillers heretofore devised and utilized are known to consist basically of familiar, expected and obvious structural configurations, notwithstanding the myriad of designs encompassed by the crowded prior art which have been developed for the fulfillment of countless objectives and requirements.

Known prior art soil tillers include U.S. Pat. No. 3,710,870; U.S. Pat. No. 4,372,397; U.S. Pat. No. Des. 291,272; U.S. Pat. No. 5,404,644; U.S. Pat. No. 3,883,789; and U.S. Pat. No. 3,129,771.

In these respects, the cordless soil tiller according to the present invention substantially departs from the conventional concepts and designs of the prior art, and in so doing provides an apparatus primarily developed for the purpose of conveniently tilling soil with a hand held unit.

SUMMARY OF THE INVENTION

In view of the foregoing disadvantages inherent in the known types of soil tillers now present in the prior art, the present invention provides a new cordless soil tiller construction wherein the same can be utilized for conveniently tilling soil with a hand held unit.

The general purpose of the present invention, which will be described subsequently in greater detail, is to provide a new cordless soil tiller apparatus and method which has many of the advantages of the soil tillers mentioned heretofore and many novel features that result in a new cordless soil tiller which is not anticipated, rendered obvious, suggested, or even implied by any of the prior art soil tillers, either alone or in any combination thereof.

To attain this, the present invention generally comprises a frame including a hollow handle with a rear portion having a disk-shaped configuration. The handle further has a front portion with a cylindrical configuration integrally mounted to the rear portion in concentric relationship therewith. The rear portion has a lower surface with a plurality of undulations formed therein. The frame further includes a cover defined by half of a hollow cylinder. The cover is coupled at a central extent thereof to a front end of the front portion of the handle in perpendicular relationship therewith. As shown in the Figures, the cover defines an open bottom face and an interior space. As best shown in FIG. 4, a drive assembly is provided including a battery mounted within the rear portion of the frame. A port extends from a rear end of the rear portion for releasably connecting with a power source for charging purposes. Mounted within the front portion of the handle is a motor which resides adjacent to the front end of the handle. A drive housing is coupled to the front portion of the handle within the cover and extending downwardly and outwardly therefrom. With reference still to FIG. 4, the gear assembly is shown to include a first bevel gear connected to the motor and extending within the drive housing. The gear assembly further includes a drive shaft rotatably coupled within the drive housing with a second bevel gear mounted thereon. Such second bevel gear remains in communication with the first bevel gear for rotating the drive shaft coincidentally therewith. A trigger is mounted on the bottom face of the handle in front of the undulations. The trigger is connected between the battery and the motor for actuating the same. Associated therewith is a speed control switch mounted on a top face of the handle adjacent to the cover for selecting a speed at which the motor runs when actuated. Next provided is a pair of tine assemblies each having a length which is less than ½ that of the cover of the frame. Each tine assembly is both removably and rotatably mounted within the cover between one of a pair of end faces thereof and the drive shaft. In use, the tine assemblies are adapted for rotating upon the actuation of the motor. As shown in FIGS. 1 & 2, a lower half of the tine assemblies extends below the open bottom face of the cover for tilling soil when rotated. Also included is a support arm having a pair of undulating rods. Each of such rods includes an inboard end pivotally coupled to the front portion of the handle adjacent to the front end thereof. Lower ends of the rods are connected. In operation, the support arm is pivotable to a retracted orientation flanking the trigger and situated within a recess formed in the bottom face of the handle. The support arm is further adapted for pivoting to a deployed orientation extending downwardly for supporting the handle in a generally horizontal orientation in use.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cordless soil tiller apparatus and method which has many of the advantages of the soil tillers mentioned heretofore and many novel features that result in a new cordless soil tiller which is not anticipated, rendered obvious, suggested, or even implied by any of the prior art soil tillers, either alone or in any combination thereof.

It is another object of the present invention to provide a new cordless soil tiller which may be easily and efficiently manufactured and marketed.

It is a further object of the present invention to provide a new cordless soil tiller which is of a durable and reliable construction.

An even further object of the present invention is to provide a new cordless soil tiller which is susceptible of a low cost of manufacture with regard to both materials and labor, and which accordingly is then susceptible of low prices of sale to the consuming public, thereby making such cordless soil tiller economically available to the buying public.

Still yet another object of the present invention is to provide a new cordless soil tiller which provides in the apparatuses and methods of the prior art some of the advantages thereof, while simultaneously overcoming some of the disadvantages normally associated therewith.

Still another object of the present invention is to provide a new cordless soil tiller for conveniently tilling soil with a hand held unit.

Even still another object of the present invention is to provide a new cordless soil tiller that includes a hand held, portable frame having a handle. Also included is a drive assembly having a power source mounted within frame and a motor for rotating upon the receipt of power from the power source. Next provided is at least one tine assembly rotatable with respect to the frame and further connected to the motor for rotating coincidentally therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new cordless soil tiller according to the present invention.

FIG. 2 is a side view of the present invention.

DESCRIPTION OF THE PREFERRED EMBODIMENT

Figure 3:
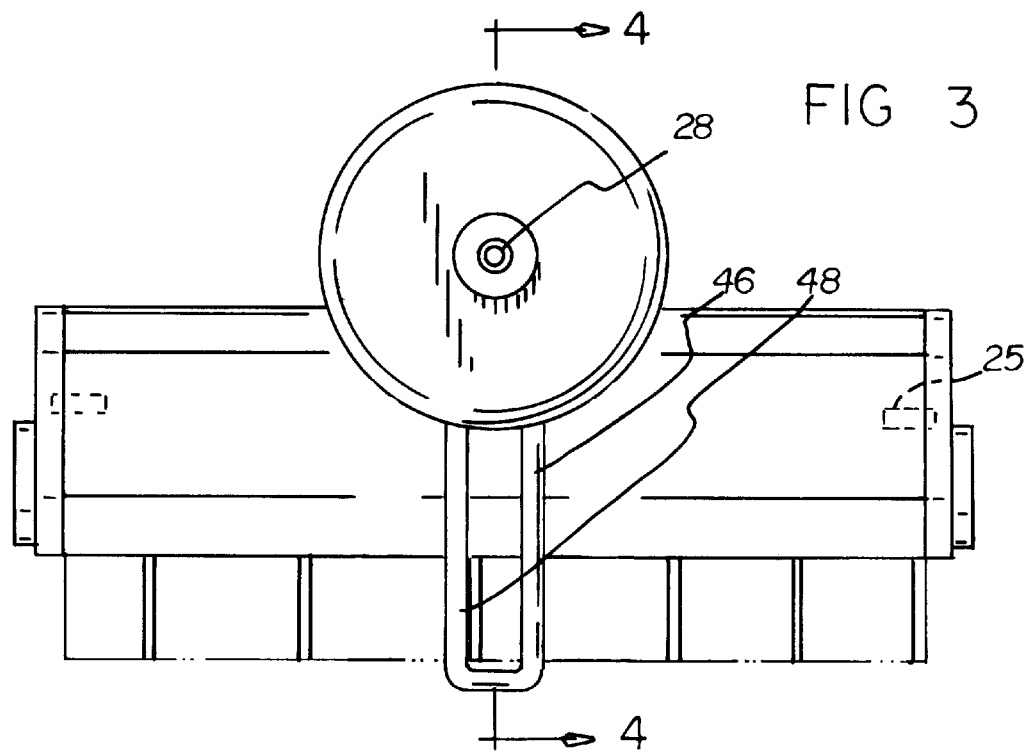
FIG. 3 is a rear view of the present invention.

With reference now to the drawings, and in particular to FIGS. 1 through 6 thereof, a new cordless soil tiller embodying the principles and concepts of the present invention and generally designated by the reference numeral 10 will be described.

The present invention, designated as numeral 10, includes a frame 12 having a hollow handle 14 with a rear portion 16 having a disk-shaped configuration. The handle further has a front portion 18 with a cylindrical configuration integrally mounted to the rear portion in concentric relationship therewith. The rear portion has a lower surface with a plurality of gripping undulations 20 formed therein. The frame further includes a cover 22 defined by half of a hollow cylinder. The cover is coupled at a central extent thereof to a front end of the front portion of the handle in perpendicular relationship therewith. As shown in the Figures, the cover defines an open bottom face and an interior space. Further, a length of the cover is preferably about equal to that of the handle.

As an option, the cover may be removable with respect to a laterally extending cross bar 23, or hand guard, of the handle. Coupling between the cover and the cross bar of the handle may be effected by way of a pair of dowels 25 which are formed on the cover and releasably engaged with the cross bar. Note FIG. 1.

Figure 4:
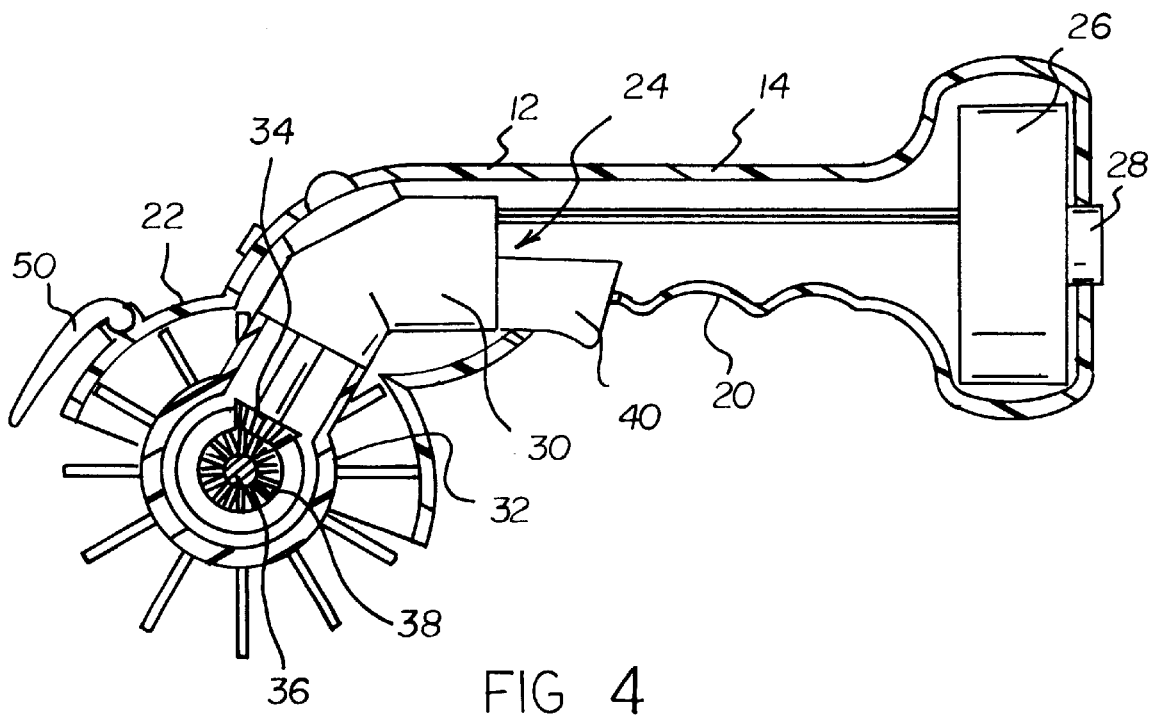
FIG. 4 is a side cross-sectional view of the present invention taken along line 4—4 shown in FIG. 3.

As best shown in FIG. 4, a drive assembly 24 is provided including a battery 26 mounted within the rear portion of the handle of the frame. A port 28 extends from a rear end of the rear portion for releasably connecting with a power source for charging purposes. Mounted within the front portion of the handle is a motor 30 which resides adjacent to the front end of the handle. A drive housing 32 is coupled to the front portion of the handle within the cover and extends downwardly and outwardly therefrom.

With reference still to FIG. 4, the gear assembly is shown to include a first bevel gear 34 connected to the motor and extending within the drive housing. The gear assembly further includes a drive shaft 36 rotatably coupled within the drive housing with a second bevel gear 38 mounted thereon. Such second bevel gear remains in communication with the first bevel gear for rotating the drive shaft coincidentally therewith. A trigger 40 is mounted on the bottom face of the handle in front of the undulations. The trigger is connected between the battery and the motor for actuating the same. Associated therewith is a speed control switch 42 mounted on a top face of the handle adjacent to the cover for selecting a speed at which the motor runs when actuated. As an option, the speed control switch may be further adapted to run the motor in reverse.

Next provided is a pair of tine assemblies 44 each having a length which is less than ½ that of the cover of the frame. As shown in FIG. 1, each tine assembly includes a central rod with a plurality of tines extending radially from the central rod along a length thereof. Each tine assembly is both removably and rotatably mounted within the cover between one of a pair of end faces thereof and the drive shaft. To accomplish such removable coupling, the tine assemblies preferably having a first end removably situated within an aperture formed in an end face of the cover. Further, a second end of each tine assembly has a female connector for releasably connecting with a male connector of the drive shaft. As an option, such male connector may be solenoid actuated for allowing the releasing of the tine assemblies by way of a button mounted on the handle.

In use, the tine assemblies are adapted for rotating upon the actuation of the motor. As shown in FIGS. 1 & 2, lower halves of the tine assemblies extend below the open bottom face of the cover for tilling soil when rotated. As an option, the tine assemblies may be removed in favor of other types of tools.

Also included is a support arm 46 having a pair of undulating rods 48. Each of such rods includes an inboard end pivotally coupled to the front portion of the handle adjacent to the front end thereof. Lower ends of the rods are connected. In operation, the support arm is pivotable to a retracted orientation flanking the trigger and situated within a recess formed in the bottom face of the handle. The support arm is further adapted for pivoting to a deployed orientation extending downwardly for supporting the handle in a generally horizontal orientation in use. Ideally, the support arm is lockable in the deployed orientation.

FIGS. 1, 2 & 4 depict a detachable rake 50 including an elongated bar having a plurality of teeth coupled to the bar. The teeth extend from the elongated bar in coplanar relationship and further terminate with flared ends. The elongated bar has a first pair of mounting posts for being releasably received within a first pair of mounting bores formed in the cover of the frame. In use, the ends of the teeth extend downwardly from the cover beyond the open bottom face thereof.

Lastly, a detachable rock pick 52 includes an elongated linear member with a J-shaped hook formed on an end thereof. Similar to the removable rake, the elongated linear member has a second pair of mounting posts for being releasably received within a second pair of mounting bores formed in the cover of the frame above the first pair of mounting bores.

Figure 5:
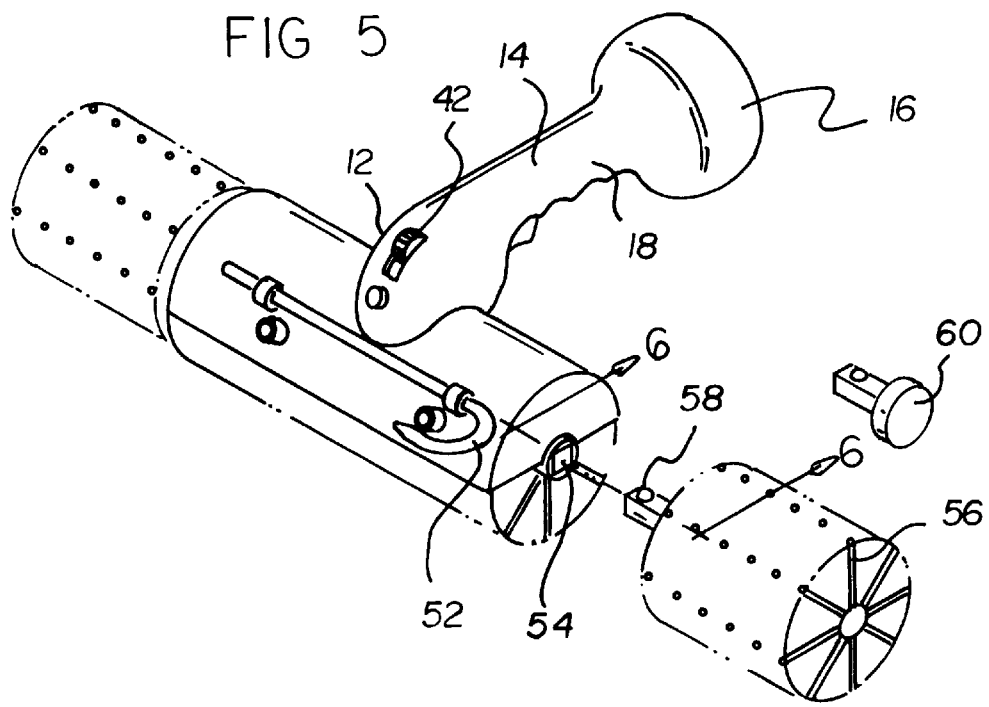
FIG. 5 is a perspective view of optional auxiliary tine assemblies of the present invention.
Figure 6:
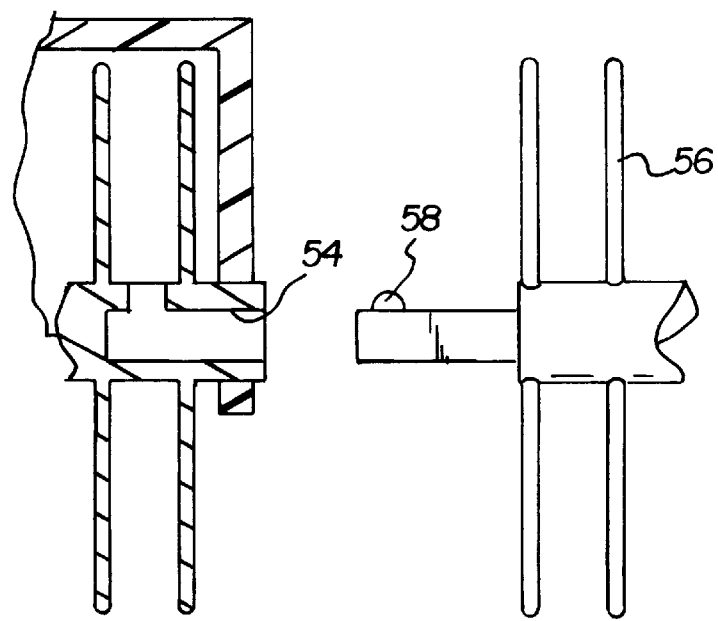
FIG. 6 is a cross-sectional view of the present invention taken along line 6—6 shown in FIG. 5.

As an option, ends of the central rods of the tine assembly may be equipped with a square recess 54 which are accessible from the cover of the frame. As shown in FIGS. 5 & 6, auxiliary tine assemblies 56 may be included each with a square connector extending from the central rod thereof. Such square connector has a spring biased ball bearing 58 engaging a recess formed within the square recess of one of the tine assemblies within the cover of the frame. Note FIG. 6. By this structure, the auxiliary tine assemblies may be releasably coupled in coaxial relationship with the tine assemblies under the cover. Further options include caps 60 for coupling within the square recesses when the auxiliary tine assemblies are not in use. Preferably, such caps are also equipped with the ball bearings.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A soil tiller comprising, in combination:
   a frame including a hollow handle having a rear portion with a disk-shaped configuration and a front portion with a cylindrical configuration integrally mounted to the rear portion in concentric relationship therewith and having a lower surface with a plurality of undulations formed therein, the frame further including a cover defined by half of a hollow cylinder integrally coupled at a central extent thereof to a front end of the front portion of the handle in perpendicular relationship therewith for defining an open bottom face and an interior space;
   a drive assembly including a battery mounted within the rear portion of the frame with a port extending from a rear end of the rear portion for releasably connecting with a power source for charging purposes, a motor mounted within the front portion of the handle adjacent to the front end thereof, a drive housing coupled to the front portion of the handle within the cover and extending downwardly and outwardly therefrom, a gear assembly including a first bevel gear connected to the motor and extending within the drive housing and a shaft rotatably coupled within the drive housing with a second bevel gear mounted thereon which remains in communication with the first bevel gear for rotating the shaft coincidentally therewith, a trigger mounted on a bottom face of the handle in front of the undulations and connected between the battery and the motor for actuating the same, and a speed control switch mounted on a top face of the handle adjacent to the cover for selecting a speed at which the motor runs when actuated;
   a pair of tine assemblies each having a length which is less than ½ that of the cover of the frame, each tine assembly removably and rotatably mounted within the cover between one of a pair of end faces thereof and the shaft for rotating upon the actuation of the motor, wherein a lower half of the tine assemblies extends below the open bottom face of the cover for tilling soil when rotated;
   a support arm including a pair of undulating rods each having an inboard end pivotally coupled to the front portion of the handle adjacent to the front end thereof and a lower end connected with that of the adjacent rod, the support arm being pivotable between a retracted orientation flanking the trigger and situated within a recess formed in the bottom face of the handle and a deployed orientation extending downwardly for supporting the handle in use;
   a detachable rake including an elongated bar having a plurality of teeth coupled to the bar and extending therefrom in coplanar relationship and terminating in flared ends, the elongated bar having a first pair of mounting posts for being releasably received within a first pair of mounting bores formed in the cover of the frame, wherein the ends of the rake extend downwardly from the cover beyond the open bottom face thereof when mounted; and
   a detachable rock pick including an elongated linear member with a J-shaped hook formed on an end thereof, the elongated linear member having a second pair of mounting posts for being releasably received within a second pair of mounting bores formed in the cover of the frame above the first pair of mounting bores.

2. A hand held soil tiller comprising:
   a hand held frame including a handle;
   a drive assembly including a power source mounted within the frame and a motor for rotating upon the receipt of power from the power source; and
   at least one tine assembly rotatable with respect to the frame and further connected to the motor for rotating coincidentally therewith, wherein a rock pick is removably coupled to the frame.

3. The hand held soil tiller as set forth in claim 2 wherein the at least one tine assembly is removably coupled to the frame.

4. The hand held soil tiller as set forth in claim 2 wherein the power source is a battery.

5. The hand held soil tiller as set forth in claim 2 wherein a plurality of auxiliary tine assemblies may be removably coupled to the at least one tine assembly in coaxial relationship therewith.

6. The hand held soil tiller as set forth in claim 2 wherein a rake is removably coupled to the frame.

7. The hand held soil tiller as set forth in claim 2 wherein the frame includes a cover for housing an upper portion of the at least one tine assembly.

8. The hand held soil tiller as set forth in claim 7 wherein a rake depends from the cover.

9. The hand held soil tiller as set forth in claim 2 wherein the handle of the frame has a trigger for selectively supplying the motor with power.

* * * * *